United States Patent
Kamalizad et al.

(10) Patent No.: US 9,485,130 B2
(45) Date of Patent: Nov. 1, 2016

(54) UNIVERSAL OFDM SYNCHRONIZER FOR POWER LINE COMMUNICATION

(71) Applicant: Semitech Semiconductor Pty Ltd, Kensington, VIC (AU)

(72) Inventors: Amir H. Kamalizad, Irvine, CA (US); Cameron Watt, Sunbury (AU)

(73) Assignee: Semitech Semiconductor Pty. Ltd., Kensington (AU)

( * ) Notice: Subject to any disclaimer, the term of this patent is extended or adjusted under 35 U.S.C. 154(b) by 0 days.

(21) Appl. No.: 14/058,281

(22) Filed: Oct. 20, 2013

(65) Prior Publication Data
US 2014/0112398 A1    Apr. 24, 2014

Related U.S. Application Data (60) Provisional application No. 61/716,579, filed on Oct. 21, 2012.

(51) Int. Cl.
*H04L 27/26* (2006.01)
*H04B 3/54* (2006.01)
*H04L 27/00* (2006.01)

(52) U.S. Cl.
CPC .............. *H04L 27/2655* (2013.01); *H04B 3/54* (2013.01); *H04B 3/542* (2013.01); *H04L 27/2675* (2013.01); *H04L 27/2692* (2013.01); *H04L 27/0008* (2013.01)

(58) Field of Classification Search
CPC .......... H04B 1/00; H04B 3/54; H04B 3/542; H04L 7/0079; H04L 27/265; H04L 27/2653; H04L 27/2655; H04L 27/2657; H04L 27/2662; H04L 27/2666; H04L 27/2675; H04L 27/2689; H04L 27/2692; H04L 27/008

USPC ............. 340/13.24; 370/206, 208, 210, 350, 370/503, 507, 508, 509, 510, 513; 330/165, 330/166, 167; 375/260–262, 265, 267, 343, 375/354, 355

See application file for complete search history.

(56) References Cited

U.S. PATENT DOCUMENTS 7,161,985 B2   1/2007   Dostert
7,693,129 B1   4/2010   Kishore
(Continued)

FOREIGN PATENT DOCUMENTS

CN   102769481 A   11/2012
JP   2010028558 A   2/2010
WO   2012041424 A1   4/2012

OTHER PUBLICATIONS

Stavros I. Tsakiris, Performance of OFDM Systems for Broadband Power Line Communications Under Low Signal Strength, Dec. 2009, pp. 41-46, Athens, Greece.
(Continued)

*Primary Examiner* — Young T Tse
(74) *Attorney, Agent, or Firm* — Henry J. Cittone; Cittone & Chinta LLP (57) ABSTRACT

A universal OFDM synchronizer for power line communication is provided. The universal OFDM synchronizer can be used for all known OFDM standards and allows maximum flexibility with best performance. The OFDM synchronizer comprises of a preamble averaging, a correlator and a peak discriminator. The OFDM synchronizer can be used with signals having 256 sample size preamble or 512 sample size preamble.

13 Claims, 6 Drawing Sheets

(56) References Cited

U.S. PATENT DOCUMENTS

| | | |
|---|---|---|
| 8,315,152 B2 | 11/2012 | Razazian |
| 8,320,233 B2 | 11/2012 | Razazian |
| 2005/0163263 A1* | 7/2005 | Gupta et al. ............ 375/343 |
| 2008/0032662 A1* | 2/2008 | Tu .......................... 455/343.1 |
| 2009/0046671 A1* | 2/2009 | Luo ......................... 370/336 |
| 2009/0303869 A1* | 12/2009 | Umari et al. ............ 370/210 |
| 2012/0093198 A1* | 4/2012 | Dabak et al. ............ 375/139 |
| 2012/0170670 A1 | 7/2012 | Zhengang |
| 2012/0320996 A1* | 12/2012 | Dabak et al. ............ 375/257 |
| 2014/0105313 A1* | 4/2014 | Kim et al. ............... 375/257 |

OTHER PUBLICATIONS

Alessandro Moscatelli, From Smart Metering to Smart Grids: PLC Technology evolutions, Apr. 5, 2011, pp. 1-28, Milan, Italy.

Aderemi A. Atayero, Adeyemi A. Alatishe, Yury A. Ivanov, Power Line Communication Technologies: Modeling and Simulation of Prime Physical Layer, Oct. 24-26, 2012, San Francisco, USA.

* cited by examiner

UNIVERSAL OFDM SYNCHRONIZER FOR POWER LINE COMMUNICATION

CROSS-REFERENCE TO RELATED APPLICATIONS

This application claims benefit to U.S. Provisional Patent Application No. 61/716,579, filed Oct. 21, 2012, the disclosure of which is hereby incorporated by reference in its entirety.

FIELD OF THE INVENTION

The present invention relates to power line communication system and more specifically, to a synchronizer used in power line communication system.

BACKGROUND OF THE INVENTION

OFDM modulation is a method of encoding digital data on multiple carrier frequencies. OFDM is essentially identical to coded OFDM (COFDM) and discrete multi-tone modulation (DMT). OFDM is a FDM in which all the carrier signals are orthogonal to each other. In OFDM, a large number of closely-spaced orthogonal sub-carriers are used for carrying data. The data is divided into several parallel data streams or channels, one for each sub-carrier. Each sub-carrier is modulated with a conventional modulation scheme at a low symbol rate. OFDM is a scheme for wideband digital communication that can be used in applications namely digital television and audio broadcasting, DSL broadband internet access, wireless networks, and 4G mobile communications. In other words, OFDM is a modulation technique where multiple low data rate carriers are combined by a transmitter to form a composite high data rate transmission.

In asynchronous systems (when packet can be received at any time i.e. no time synchronized beacon or super frame) the receiver has to run all the time. This can cause a lot of power to be wasted as most of the time is spent waiting for a packet. By using a synchronizer peak to wake up the CPU in a power optimized hardware configuration, most of the system can be put in sleep mode. The CPU qualifies the peak to find the sample leading to the highest correlation score.

OFDM has gained a lot of attention for power line communication, particularly in the sub 500 KHz frequency band. There are emerging standards in this frequency band, with applications in automatic meter reading, advanced metering infrastructure, solar, and electric vehicle. PRIME, G3, IEEE 1901.2 and ITU G.hnem are some of the prominent OFDM based standards that use different flavors of OFDM. All of these standards are packetized OFDM system (vs. streaming OFDM) so they all start with a preamble signal.

OFDM synchronizer is used for wired and wireless communication for high data-rate transmission. There are 2 classes of OFDM solutions: One that uses a 256-sample size preamble and FFT (IEEE 1901.2, G3 and G.hnem) and the other that uses a 512 sample size preamble and FFT (PRIME).

OFDM is very sensitive to synchronization and since the power line channel is an extremely harsh environment, it can suffer deep and ongoing fading, distortion and noise in significant portions of the frequency band. This means that traditional preamble signals that use significant portions (or all) of the frequency band can become undetectable (this is the case with full band chirp signal used in PRIME, G3 and IEEE 1901.2). Therefore, power line communication needs a robust and flexible synchronizer particularly where communication is expected in negative SNR values.

In order to save on hardware and allow maximum flexibility with best performance, a universal synchronizer is designed that is used for all the standards namely PRIME, G3, IEEE 1901.2 and ITU G and any new flavors that are not covered by these aforementioned standards.

SUMMARY OF THE INVENTION

The present invention provides an OFDM synchronizer for narrowband signals powerline communication. The OFDM synchronizer is compatible with all known standards of the powerline communication and is used in narrow band channels. The known OFDM standard in powerline communication includes PRIME, G3-PLC, G.hnem, and IEEE 1901.2. The OFDM synchronizer consists of three sections: a preamble averaging section, a correlator section and a peak discriminator section. The preamble averaging section is used to increase the SNR of a signal when some parts of the preamble sections are identical. The correlator of the OFDM synchronizer is designed to work with a 256 sample size preamble and a 512 sample size preamble. The correlator generates a correlation metric by multiplying and accumulating the incoming sample or the value coming out of the averaging block and the locally stored reference of the preamble. The correlator calculates the correlation metric for a 256 sample size preamble. For other standards such as PRIME, where the preamble is of 512 sample size, the correlator splits the 512 sample size preamble into two 256 sample size preambles and then the correlation metric is generated by the correlator. The peak discriminator shapes the correlation metric to get the maximum correlation by adding the adjacent correlation results constructively.

BRIEF DESCRIPTION OF THE DRAWINGS

The preferred embodiment of the invention will hereinafter be described in conjunction with the appended drawings provided to illustrate and not to limit the scope of the invention, wherein like designation denote like element and in which.

DETAILED DESCRIPTION OF THE INVENTION

In the following detailed description of embodiments of the invention, numerous specific details are set forth in order to provide a thorough understanding of the embodiments of the invention. However, it will be obvious to a person skilled in the art that the embodiments of the invention may be practiced without these specific details. In other instances, well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art without parting from the spirit and scope of the invention.

The present invention provides an OFDM synchronizer that is designed to be used for the available standards and applications in powerline communication with emphasis on narrow band communication scheme. Some of the OFDM standards that are used primarily in power line communication channels are PRIME, G3, IEEE 1901.2 and ITU G.hnem. These standards are packetized OFDM system and data is communicated in the form of discrete packets. Each packet starts with a preamble signal that is used for synchronization. The OFDM synchronization architecture can be used with any preamble signal.

The universal OFDM synchronizer has 3 sections: a preamble averaging, a correlator and a peak discriminator. The preamble averaging section is optional and is used when some part of the preamble symbols are identical. The preamble averaging enhances the SNR of the signal having identical parts in preamble symbols. In an embodiment of the present invention, the preamble averaging can be used for redundant transmissions having up to 4 narrowband channels in non-overlapping frequency regions. The correlator is used to perform the multiplication and accumulation of the received signal or the value coming out of the averaging block with the local reference. The peak discriminator is used to shape the correlation metric to get the maximum correlation by adding the few adjacent correlation results constructively.

The correlator is designed to process both the 256 sample size preamble as well as 512 sample size preamble. This is achieved by breaking the 512 sample size preamble into two halves and treating each half as a separate 256 sample preamble. For each half of the split 512 sample preamble, a reference is stored in the correlator.

The universal OFDM synchronizer uses same hardware and a cross correlator for processing the 256 sample size preamble and 512 sample size preamble. The correlator splits the 512 sample size preamble into two halves of 256 samples each. The cross correlator then correlates the value of each of the split 256 sample preamble. This enables the universal synchronizer system to have the same state machine for the receiver control and leads to significant power saving (this particularly applies to the original PRIME specifications where there is only 1 preamble present).

The main purpose of universal OFDM synchronizer is to facilitate robust and high data rate reception over power line communication using different OFDM based standards. The embodiment is implemented for power line communication particularly in the sub band of 500 KHz frequency. Different standards are used and all of these standards are packetized OFDM systems that start with a preamble signal that is used for synchronization.

Figure 1:
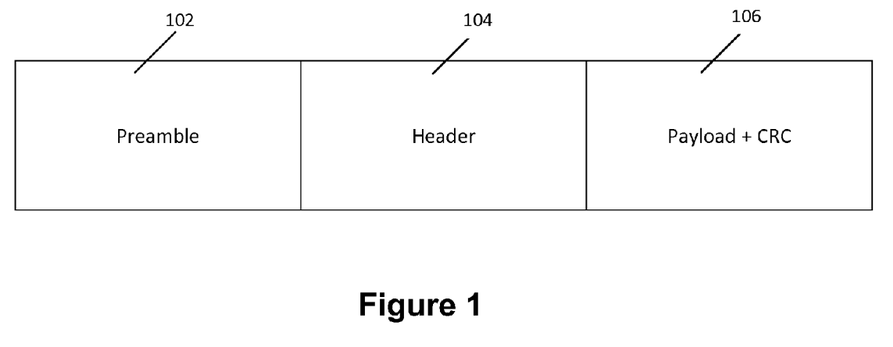
FIG. 1 illustrates an OFDM frame structure in accordance with an embodiment of the present invention.

FIG. 1 illustrates an OFDM frame structure in accordance with an embodiment of the present invention. Referring to FIG. 1, the OFDM frame consists of a preamble 102, a header 104, a payload and a CRC 106. The preamble 102 is a hard-coded sequence used by the receiver for automatic gain control, channel estimation, carrier frequency offset estimation and symbol timing acquisition. The preamble 102 for use in powerline communication is either of 256 sample size or of 512 sample size. The header 104 contains the type of packet and important information about how to handle the packet. This can include the destination address, size, modulation and coding of the packet, phase information, and etc. The payload 106 refers to individual units of transmission content that are of interest at the receiver end.

The payload 106 is DBPSK, DQPSK or D8PSK encoded, depending on the SNR available to achieve the desired BER. The MAC layer will select the best modulation scheme using information from link quality measures and errors in the last frames to provide the best compromise between throughput and efficiency in the communication. The OFDM transmitter system includes a checksum calculation and an insertion block. This block appends two bytes to the payload 106 with a 16-bit CRC calculated over the full contents of the payload.

The preamble 102 is the first of three parts of a PPDU (PLCP protocol data unit). The preamble 102 usually consists of two parts: The repetitive P symbols that are used for symbol timing acquisition i.e. the presence of signal and the boundary for FFT and the M symbol that has a distinct phase different from P symbols (usually 180 degrees phase difference) and is used for frame detection. Frame detection marks the transition from preamble to header. Original PRIME 1.3.6 specification uses only one preamble to achieve both symbol timing and frame timing. A receiver will begin to demodulate the incoming signal after detecting the preamble. In packetized data transmissions systems, transmitted messages are susceptible to various types of bit errors due to noise, interference, data collisions, and multipath in a given channel. CRCs (Cyclic Redundancy Codes) are very useful in detecting single bit errors, multiple bit errors, and burst errors in packetized messages. The size of CRC is 16 bits.

Figure 2A:
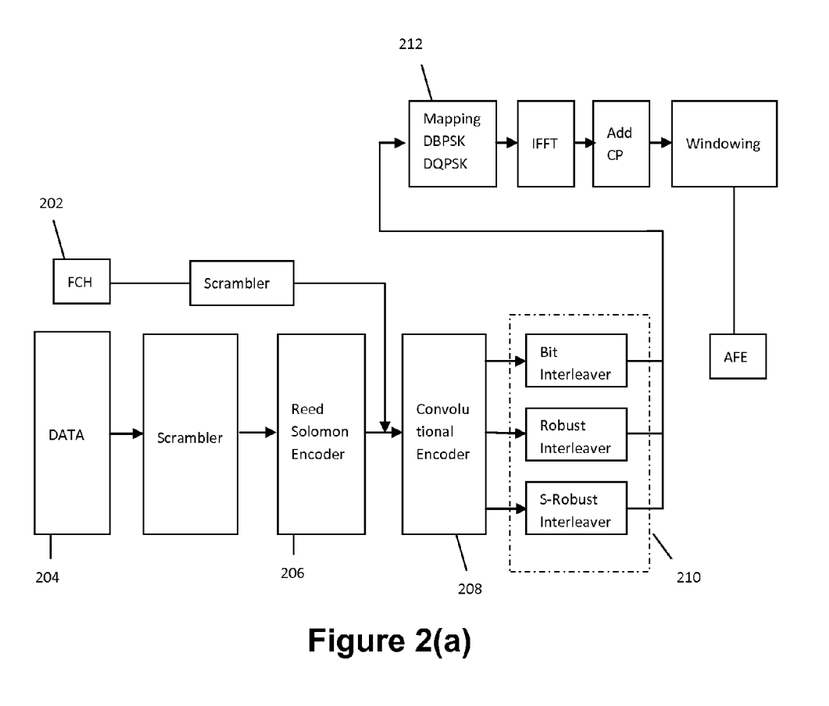
FIGS. 2(a) and 2(b) show a transmitter side of a G3 communication system and a PRIME standard in accordance with embodiments of the present invention.
Figure 2B:
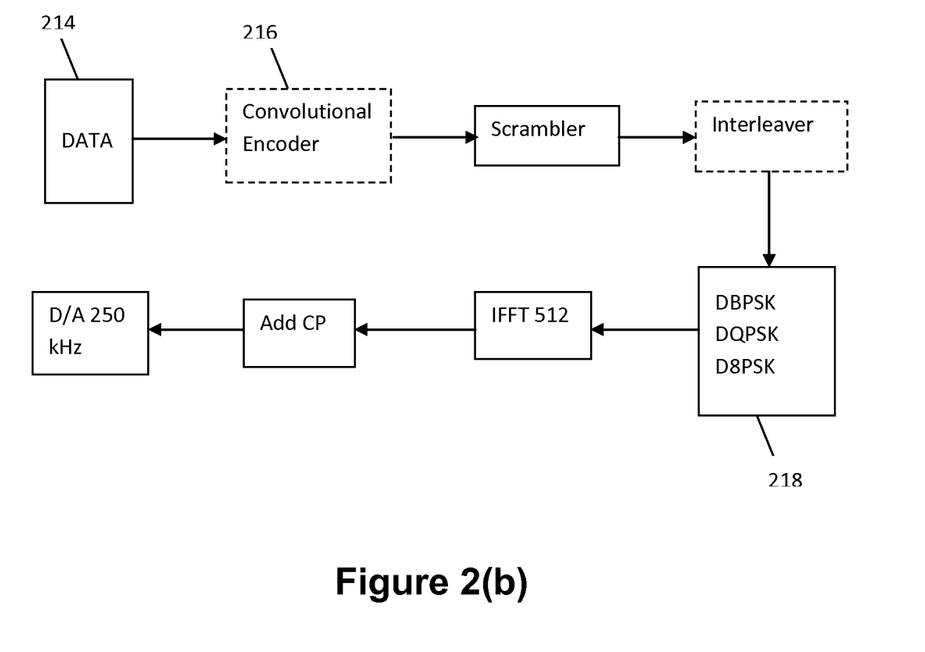

FIGS. 2(a) and 2(b) show a transmitter side of a G3 communication system and a PRIME standard, in accordance with embodiments of the present invention. Referring to FIG. 2(a), the G3 communication offers three modes 212 "Robust", "DBPSK", and "DQPSK", facilitating packets of data of at maximum 133, 235, and again 235 bytes, at a data rate of 33.4 kbps maximum (in DQPSK mode). In all modes, the data integrity is protected by the rate—½ convolutional code 208 with generator polynomials 171 and 133 and interleaved within the whole packet. Frame control header (FCH) 202 data and data in robust mode are additionally repeated six and four times respectively, by the interleaver 210 prior to DBPSK modulation (repetition coding). Non-FCH data 204 are encoded with an appropriately shortened Reed Solomon (RS) code 206 that is based on RS (255, 247) for robust, and RS (255, 239) for DBPSK and DQPSK mode. The PSK symbols are differentially encoded per subcarrier in time (DPSK), thus carriers that suffer from frequency selective attenuation or disturbance can be switched off. Thereto, the subcarriers are arranged in six groups and a "Tone Map" field in the FCH indicates which of them are active.

Referring to FIG. 2(b), the PRIME communication offers DBPSK, DQPSK, or D8PSK modulation scheme 218 using convolutional encoder 216. PRIME is able to transport at maximum 2268 bytes per packet at 128.6 kbps using uncoded D8PSK, while its most robust protocol, coded DBPSK, can carry 377 bytes per packet at 21.4 kbps. Thereby, FCH data 214 are always transmitted employing coded DBPSK. The convolutional code applied in PRIME is the same as in G3, however, interleaving is done over single OFDM symbol.

Both the G3 and prime standards are OFDM based techniques but they have considerable differences. The G3 specification supports the functionality of modems in portion of frequencies between 35.9 kHz to 90.6 kHz of the CELENEC-A band where there is an option to extend the upper frequency to 490 kHz (G3-FCC), while "PRIME" specification is intended to support the functionality of modems in the 42 kHz to 89 kHz frequency range. The sampling frequency of G3 is f=400 kHz with a FFT size of 256, leading to a subcarrier spacing of 1.5625 kHz (f=f/M) between OFDM carriers. In PRIME, the sampling frequency is f=250 kHz, the FFT size of M=512, leading to a subcarrier spacing of f=488 Hz. The preamble in G3 is of 256 sample size and in PRIME is of 512 sample size.

Figure 3:
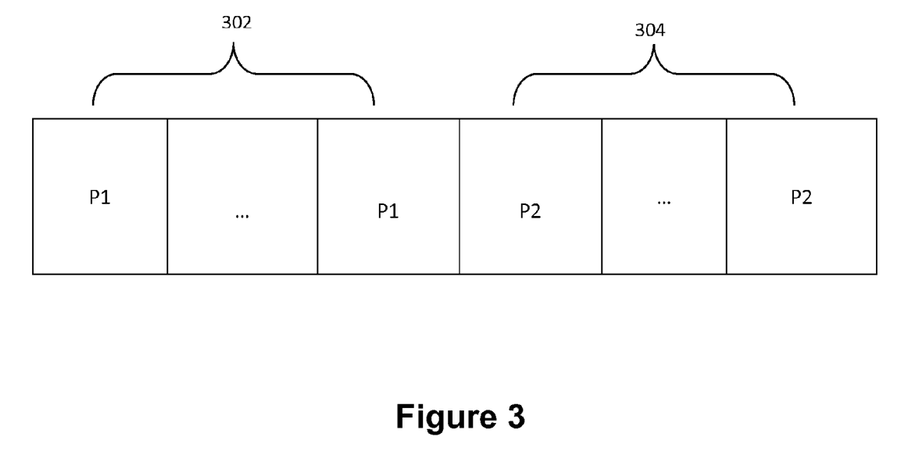
FIG. 3 shows the construction of a preamble in an OFDM signal in accordance with an embodiment of the present invention.

FIG. 3 shows the construction of a preamble in an OFDM signal in accordance with an embodiment of the present invention. Referring to FIG. 3, the preamble has P1 symbol 302 occurring n times and P2 symbol 304 is repeated m times. Symbol P1 302 is used to find the symbol timing (i.e. FFT boundary) and symbol P2 304 is used to find the frame boundary i.e. start of header. For different standards, symbols P1 302 and P2 304 have either size of 512 (PRIME) of 256 (IEEE 1901.2, G3, G.hnem). Also the symbols P1 302 and P2 304 can be any signal (preferably with low PAPR and good auto correlation characteristic). The preamble signal used in G3, PRIME and IEEE 1901.2 is a chirp signal; however the present invention can use any OFDM signal. A chirp signal is a signal in which the frequency increases (up-chirp) or decreases ('down-chirp') with time.

Figure 4:
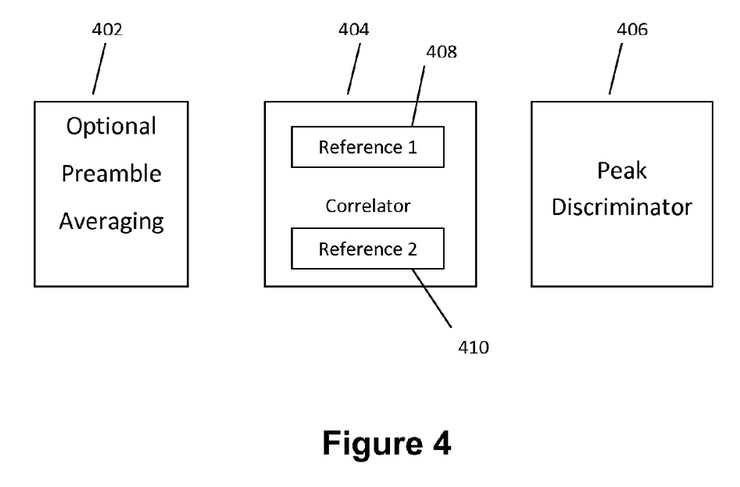
FIG. 4 discloses a universal OFDM synchronizer having multitude of operation modes addressing all common OFDM standards in accordance with an embodiment of the present invention.

FIG. 4 discloses a universal OFDM synchronizer having multitude of operation modes addressing all common OFDM standards in accordance with an embodiment of the present invention. Referring to FIG. 4, the universal OFDM synchronizer comprises of three sections, namely a preamble averaging 402, a correlator 404 and a peak discriminator 406. Preamble averaging 402 can be used in cases where the identical P symbol exists to increase the SNR before correlation. Correlator 404 is used to perform the multiplication and accumulation of the received signal or value coming out of the averaging block with preamble's local copy. In the present invention, the cross correlator 404 is designed for 256-sample size preamble which is a characteristic feature of IEEE 1901.2, G3, G.hnem standards. The cross correlator, correlates the 256 sample size preamble in a single go.

The OFDM synchronizer uses the 256-sample based correlator 404, and for processing the 512 sample size preamble, such as in PRIME standard, the correlator divides the PRIME preamble into two halves. The universal OFDM synchronizer comprises a multitude of operation modes addressing all common OFDM standards including full compliance with IEEE 1901.2, G3-PLC, PRIME and G.hnem.

For correlating the 512 sample size preamble, the correlation is essentially achieved by breaking the 512-sample size preamble into two halves and treating each half as a separate 256-sample size preamble. Output from preamble averaging block 402 is fed to the correlator block 404. The correlator 404 keeps two different references (i.e. local copies of preambles): Reference1 408 and Reference2 410. This enables the system to have the same state machine for the receiver control that will lead to significant power saving. This particularly applies to the original PRIME specifications where there is only 1 preamble present and the synchronizer score from the first half can be used to wake up the processor. Peak discriminator 406 is used to shape the correlation metric to get the maximum correlation by adding the few adjacent correlation results constructively.

The powerline channel is an extremely harsh environment and it can suffer deep and ongoing fading, distortion and noise in significant portions of the frequency band. This means that traditional preamble signals that use significant portions (or all) of the frequency band can become undetectable (this is the case with full band chirp signal used in PRIME, G3 and IEEE 1901.2). Therefore, power line communication needs a robust and flexible synchronizer particularly where communication is expected in negative SNR values. To combat the distortion, deep and ongoing fading and noise in significant portions of the frequency band, the universal synchronizer is used in "narrow band" mode, whereby the reference is chosen to be of limited bandwidth. To maximize the detectability of the narrow band preamble, a programmable bandpass filter is utilized prior to the synchronizer and separate from the main data path that feeds the FFT. The bandpass filter serves to increase the SINR of the signal processed by the universal synchronizer by minimizing band noise and interference.

As the signal that is sent to the FFT engine is not subjected to the same narrowband bandpass filters, it is possible to still utilize other frequency bands when the channel is not "spectrally compromised".

Figure 5:
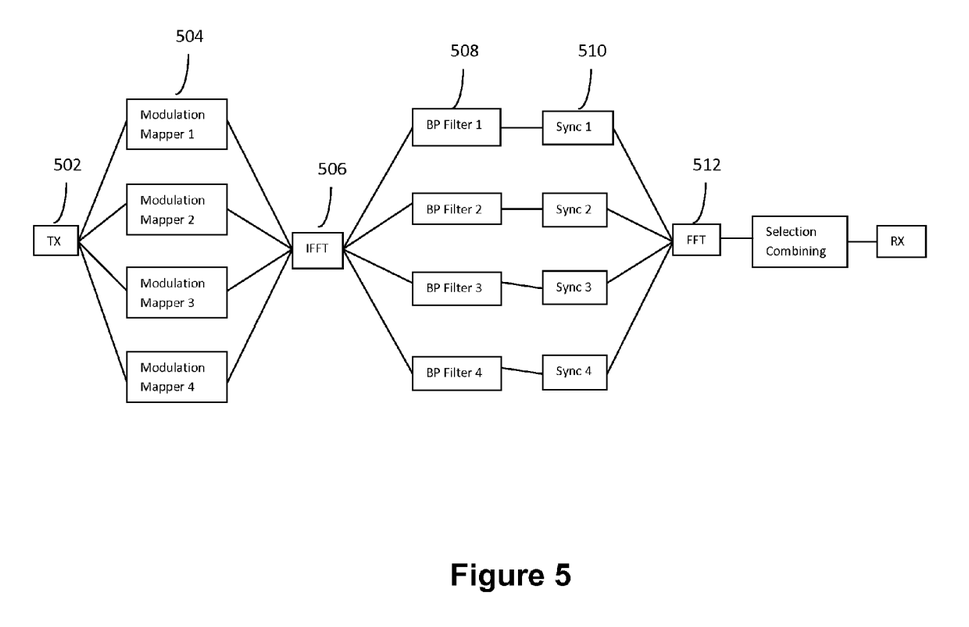
FIG. 5 illustrates a redundant narrowband OFDM system using universal OFDM synchronizer in accordance with an embodiment of the present invention.

FIG. 5 illustrates a redundant narrowband OFDM system using universal OFDM synchronizer in accordance with an embodiment of the present invention. A transmitter 502 transmits the OFDM signal to the modulation mapper 504 so that the signals become modulated. Inverse fast fourier transformation is performed then on the modulated signal by IFFT block 506. To maximize the detecting ability of the narrow band preamble, a programmable band-pass filter 508 is utilized prior to the synchronizer 510 and separate from the main data path that feeds the FFT 512. The band-pass filter 508 serves to increase the SINR of the signal processed by the universal synchronizer by minimizing out-of-band noise and interference. Band-pass filter 508 is a device that passes frequencies within a certain range and rejects (attenuates) frequencies that are not within that range. A Fourier transform converts time (or space) to frequency and vice versa; an FFT rapidly computes such transformations.

The filters 508 and synchronizers 510 are replicated and every other parameter is shared. These narrow band synchronizers 510 result in robustness of data even in very harsh channels.

Figure 6:
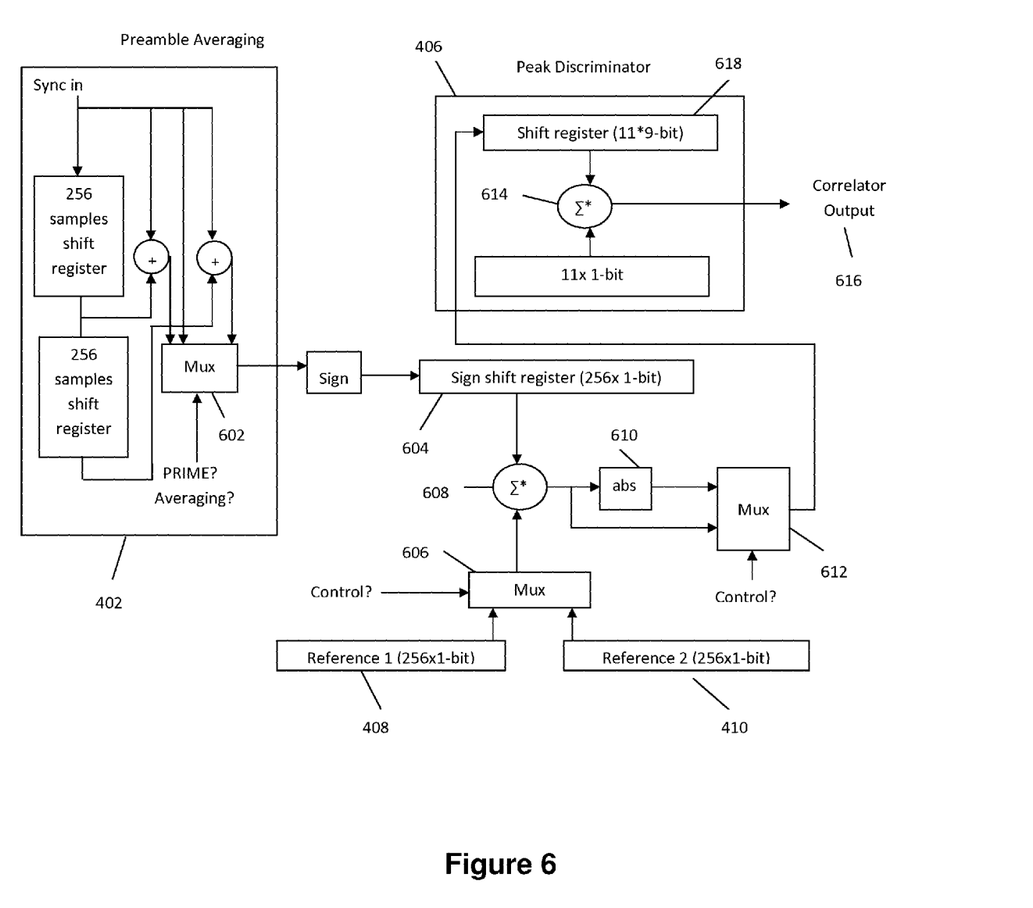
FIG. 6 shows a representation of path followed by the data in the correlator of universal OFDM synchronizer in accordance with an embodiment of the present invention.

FIG. 6 shows a representation of path followed by the data in the correlator of universal OFDM synchronizer in accordance with an embodiment of the present invention. The incoming signal is received in the preamble averaging section 402, the preamble of the signal is processed so as to increase the SNR of the signal. The shift register receives 256 samples of the incoming signal sequence. In FIG. 6, a signal with a preamble is shown, where if the preamble is of the PRIME standard, then the preamble is divided into two halves of 256 samples size each. A multiplexer 602 is used to select the data and it forwards the data to the correlator through a sign shift register 604. The sign shift register 604 uses a sign bit scheme to store the previous on/off status. Each new change in status gets stored in the first bit and the remaining bits get shifted down the train. The local copy of segmented PRIME preamble is stored as Reference1 408 and Reference2 410. The data selection based on the controls is made by a multiplexer 606 that forwards the selected data to a sum switch 608. The sum switch 608 combines the input from the sign shift register 604 and the multiplexer 606 and forwards it to a abs block 610 to calculate the absolute value. The output from the sum switch 608 and the abs 610 is passed to a multiplexer 612 for the data selection, which then forwards the signal to a peak discriminator 406. The peak discriminator 406 has a shift register 618 with sign bit multiplication scheme of 11*9-bit and a sum switch 614 that combines the absolute values of the signal to generate a correlator output 616. The peak discriminator 406 adds the correlation result constructively by keeping the signs and then deriving the absolute value. This scheme ensures that the side lobes and the noise floor for correlation are smaller and that makes the synchronization more robust.

In an embodiment of the present invention, the cross correlator is used for PRIME signal as the PRIME signal has a single preamble and for IEEE 1901.2 standard, an auto correlator or a cross-correlator can be used.

In another aspect of the present invention, the single correlator structure for all known OFDM standards is used. The correlator is a 256-sample based correlator and for PRIME signal, the correlator segments the 512-sample size preamble into two 256-sample size preambles.

In another aspect of the present invention, the preamble signals are averaged to increase the SNR of the signal. The averaging ensures the noise mitigation and robustness of the synchronizer. The averaging is performed on the redundant preamble symbols.

Figure 7:
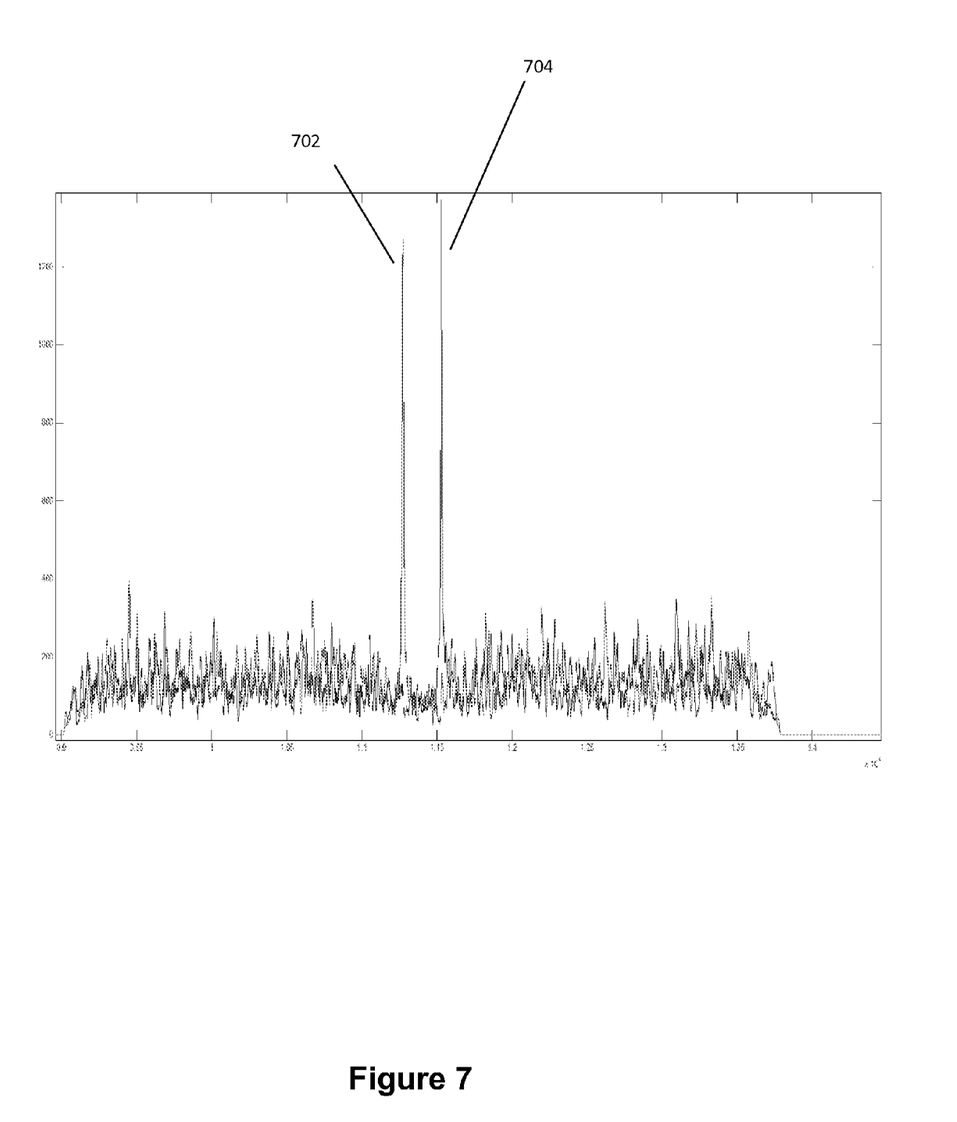
FIG. 7 shows an output from the correlator of the universal OFDM synchronizer in accordance with an embodiment of the present invention.

FIG. 7 shows an output from the correlator of the universal OFDM synchronizer in accordance with an embodiment of the present invention. This is another aspect of the invention to use a peak discriminator after the correlation. The peak discriminator increases the peak value of the correlation score in relation to noise. It facilitates detecting the output having reached the minimum threshold value and thus aids in decision making. The correlator output in the FIG. 7 displays two peaks 702 and 704. The peaks 702 and 704 are used to detect the sample timing and ensure that there is no false detection as for each preamble symbol, there will be a corresponding peak.

In an embodiment of the present invention, the peak discriminator can be used to enable a power efficient reception. The first peak 702 can be used to wake a processor on detection which otherwise remains in sleep mode. Thus, the timely activation of the processor will make the system power efficient.

The present invention is applicable for high data rate transmission, used in residential and commercial purposes and introduces universal OFDM synchronizer scheme for PRIME, G3, IEEE 1901.2 and ITU G.hnem and OFDM based standards that utilize different flavors of OFDM for highly reliable data transmission using power line communication.

The present invention is applicable in automatic meter reading (AMR), advanced metering infrastructure (AMI), solar, electric vehicle and other such related areas.

The advantages of the present invention include powerful communication, ensuring scalability, flexibility, reliability, increased predictability and minimized loss of service during communication in the varying time-scales.

We claim:

1. An OFDM synchronizer for a narrowband signal in a powerline communication compatible with a 256 samples preamble as well as a 512 samples preamble of an OFDM standards comprising:
    a correlator configured to:
    generate a correlation metric for a preamble of the narrowband signal when the preamble is the 256 samples preamble, by multiplying and accumulating the preamble with a stored local reference corresponding to the 256 samples preamble;
    split the preamble of the narrowband signal when the preamble is the 512 samples preamble, into a first half of 256 samples preamble and a second half of 256 samples preamble and generating the correlation metric for the first half of 256 samples preamble and the second half of 256 samples preamble by multiplying and accumulating with the stored local reference corresponding to the first half of 256 samples preamble and the second half of 256 samples preamble; and
    a peak discriminator configured to discriminate a peak with a correlation score in the correlation metric, the peak discriminator adds a correlation score adjacent to the peak constructively using a sign bit multiplication scheme to the correlation score of the peak.

2. The OFDM synchronizer of claim 1 wherein the preamble is 256 samples.

3. The OFDM synchronizer of claim 1 wherein the preamble is 512 samples.

4. The OFDM synchronizer of claim 1 wherein the preamble is a chirp signal.

5. The OFDM synchronizer of claim 1 wherein the first half of 256 samples preamble and the second half of 256 samples preamble are multiplied independently with the stored local reference corresponding to the first half of 256 samples preamble and the second half of 256 samples preamble.

6. The OFDM synchronizer of claim 1 wherein the OFDM standards comprises IEEE 1901.2, PRIME, G3-PLC, and G.hnem.

7. The OFDM synchronizer of claim 1 wherein the correlation score of the first half of the 256 samples preamble are used to wake a processor from sleep resulting in a low power implementation.

8. The OFDM synchronizer of claim 1 wherein the received signal is passed through a preamble averaging section to enhance a signal to noise ratio (SNR) value of the received signal by averaging signals with identical preambles.

9. The OFDM synchronizer of claim 8 further comprising a bandpass filter placed before the preamble averaging section, said bandpass filter is configured to remove an out of band noise and interference of the received signal.

10. A method for providing a universal synchronizer compatible with a 256 samples preamble as well as a 512 samples preamble of an OFDM standards, comprising:
    providing, a correlator in the universal synchronizer to process a preamble of 256 samples by multiplying and accumulation of a received signal with a stored reference copy; the synchronizer is configured to split a preamble of 512 samples into a first half preamble with 256 samples and a second half preamble with 256 samples, and then process the first half preamble and the second half preamble independently; and
    generating a correlation metric for the received signal.

11. The method of claim 10 wherein the OFDM standards comprises IEEE 1901.2, PRIME, G3-PLC, and G.hnem.

12. The method of claim 10 wherein the preamble of 256 samples or 512 samples is a chirp signal.

13. The method of claim 10 wherein the first half preamble and the second half preamble are stored as an independent reference.

* * * * *